(12) United States Patent
Wlodarczyk

(10) Patent No.: US 6,779,718 B1
(45) Date of Patent: Aug. 24, 2004

(54) METHOD FOR AUTHENTICATING THE RESULT OF AN INSTRUCTION IN A TOKEN

(75) Inventor: Lukasz Wlodarczyk, Paris (FR)

(73) Assignee: Schlumberger Systemes, Montrouge (FR)

( * ) Notice: Subject to any disclaimer, the term of this patent is extended or adjusted under 35 U.S.C. 154(b) by 70 days.

(21) Appl. No.: 10/111,875
(22) PCT Filed: Oct. 17, 2000
(86) PCT No.: PCT/FR00/02894
  § 371 (c)(1),
  (2), (4) Date: Aug. 29, 2002
(87) PCT Pub. No.: WO01/31595
  PCT Pub. Date: May 3, 2001

(30) Foreign Application Priority Data

Oct. 29, 1999 (FR) .............................. 99 13632

(51) Int. Cl.⁷ ................................ G06K 5/00
(52) U.S. Cl. ................. 235/380; 235/382.5; 705/65
(58) Field of Search ............... 235/380, 382, 235/382.5, 492; 902/1–5; 705/64–65, 67, 71–76; 709/229; 713/186

(56) References Cited

U.S. PATENT DOCUMENTS

| | | | | |
|---|---|---|---|---|
| 5,161,231 A | * | 11/1992 | Iijima | 710/15 |
| 5,369,760 A | * | 11/1994 | Iijima | 714/48 |
| 6,085,249 A | * | 7/2000 | Wang et al. | 709/229 |
| 6,092,202 A | * | 7/2000 | Veil et al. | 713/201 |
| 6,585,164 B1 | * | 7/2003 | Cooreman et al. | 235/492 |
| 6,615,194 B1 | * | 9/2003 | Deutsch et al. | 705/75 |
| 2002/0178370 A1 | * | 11/2002 | Gurevich et al. | 713/189 |

FOREIGN PATENT DOCUMENTS

| | | | |
|---|---|---|---|
| EP | 0 559 205 | 9/1993 | G06K/19/06 |
| EP | 0 881 590 B1 | 12/1998 | G06K/7/00 |
| FR | 2 684 466 | 6/1993 | G06F/13/00 |
| FR | 2 774 196 | 7/1999 | G06K/19/073 |

OTHER PUBLICATIONS

International Search Report, Application No. PCT/FR 00/02894 dated Dec. 20, 2000, 3 pages.

* cited by examiner

Primary Examiner—Diane I. Lee
(74) Attorney, Agent, or Firm—Osha & May L.L.P.

(57) ABSTRACT

The invention concerns a method to authenticate the result of executing a command in a token connected to a terminal, the terminal including a communication device to send information to a user of the token, the token transmitting a result to the terminal following the execution. The invention is characterized in that the method includes the steps according to which:

a check is carried out to find out whether the command has a sensitive nature, if the command has a sensitive nature, the following steps are carried out, according to which:

for any sensitive potential results of the command, at least one item of digitizable information is input via an interface including an input device connected to the token, and the item of digitizable information is transmitted to the token.

10 Claims, 2 Drawing Sheets

METHOD FOR AUTHENTICATING THE RESULT OF AN INSTRUCTION IN A TOKEN

FIELD OF THE INVENTION

This invention concerns a method to authenticate the result of executing a command in a token connected to a terminal, the said terminal including a device to communicate information to a user and transmitting the said command to the said token, the said token transmitting a result to the terminal following the said execution.

BACKGROUND OF THE INVENTION

A particularly advantageous application of the invention lies in fields such as banking, telephony and health care, which require the result of executing a command to be authenticated, for example during transactions carried out via the Internet between the buyer of a service and the supplier of the said service. The supplier is for example a car dealer. The supplier called user has a token connected to a terminal linked to a communication network. The purchaser has a certificate as defined in the standard X509 published by the ISO. This certificate is unique and specific to a purchaser. It is public. It includes data such as a public key, the name and electronic address of the purchaser, certificate expiry dates, etc. When the purchaser wants to buy a car, he issues a transaction request via the communication network. To check the transaction request between the purchaser and the supplier, a known method in state of the art technology includes the steps according to which:

the purchaser's certificate is sent to the supplier, a signature on the sensitive data in the transaction request is calculated using a private key associated with the purchaser, the transaction request and the said signature are transmitted to the supplier's terminal via the communication network, in the token connected to the terminal of the said supplier, a command to check the signature of the transaction request is executed using the purchaser's public key which is in the purchaser's certificate, a message indicating the result of the check is displayed on the screen of the said terminal, and if the result displayed is positive the transaction is authorised.

Although, using this method, the supplier can check the signature of a transaction request, this method does not fully guarantee to the supplier that the data of the transaction request reaching his terminal has not been modified beforehand by a defrauder spying on the network. For example, if the transaction request includes a delivery address for the car, a defrauder can modify this address and have the car delivered at the purchaser's expense. Of course, the signature check will be false, but the defrauder can also, via the network, place on the supplier's terminal a virus intercepting the result of the signature check from the token in order to display instead of a false result, a positive result on the screen of the said terminal.

SUMMARY OF THE INVENTION

Thus, a technical problem to be solved by the present invention is to propose a method to authenticate the result of executing a command in a token connected to a terminal, the said terminal including a communication device to send information to a user and transmitting the said command to the said token, the said token transmitting a result to the terminal following the said execution, which stops a defrauder intercepting and modifying the result of executing a command without the user of the token realising, and which in addition must be easy to implement.

A solution to the technical problem posed consists, according to this invention, in that the said method includes the steps according to which:

a check is carried out to find out whether the command has a sensitive nature, if the command has a sensitive nature, the following steps are carried out, according to which:

for any sensitive potential result of the command, at least one item of digitisable information is input via an interface including an input device connected to the said token, and the said at least one item of digitisable information is transmitted to the said token, the said command is executed in the said token, an answer indicating the result of executing the command is transmitted from the said token to the terminal, the said answer including, for a sensitive result, the said at least one item of digitisable information associated with the said result, if the result is sensitive, a check is carried out using the communication device of the said terminal to ensure that the said answer includes the said at least one item of digitisable information input corresponding to the said result.

Thus, as will be described in detail below, the method of the invention can be used, by transmitting an answer indicating the result of executing the command and including at least one item of digitisable information input by a user of the token if there is a sensitive result, to guarantee to the said user that the answer transmitted by the communication device of the terminal does correspond to the result produced by the said token.

DESCRIPTION OF THE DRAWINGS

The following description made with reference to the accompanying drawings, given as non-limiting examples, makes it easy to understand what the invention consists in and how it can be realised.

DETAILED DESCRIPTION

This description of the invention concerns the example of a transaction via the Internet. Nevertheless, it is clear that the invention applies generally to any other application requiring a check on the execution of a command when a terminal is not secured.

Figure 1:
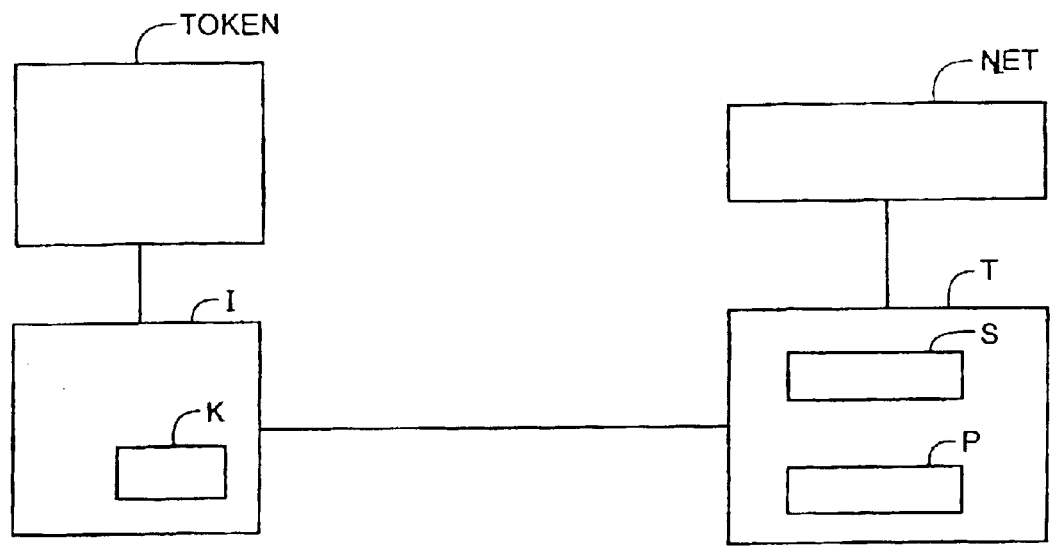
FIG. 1 is a diagram of a terminal and a token.

FIG. 1 represents a token TOKEN and a terminal T. The terminal is connected to a communication network NET and includes a communication device S to send information to a user and an application program P or software program to supply one or more services. The token is connected to an interface I including an information input device K. To carry out a service, a command CD is sent by the application program P in the token to be executed, such as for example checking a signature concerning a transaction. A command CD includes input parameters PAR. For example, a signature check command includes parameters such as:

the signature to be checked, the signed transaction data.

In order to authenticate the result of executing the command CD in the said token TOKEN, in a first step, before sending the command CD by the terminal T in the token TOKEN, using the application program P, a check is made to see whether the command has a sensitive nature. A command has a sensitive nature if the result of this command is important for the correct operation and security of the token as well as the service proposed, in this case the transaction. Of course, for each service, in the application program P, indices of correct operation are first determined and each command is classified by allocating it a sensitive nature, or not. For example, we assume that a signature check has a sensitive nature, whereas updating historical data of a transaction request does not have a sensitive nature.

Afterwards, the command CD is sent via the terminal T in the token TOKEN.

If the command CD does not have a sensitive nature, the command is executed in the token and, if necessary, the result of the command is notified to the user of the token via the communication device S of the terminal T.

Otherwise, for any command which has a sensitive nature such as a signature check command, securing information SINF and formatting information FINF of the said at least one item of digitisable information NB to be taken into account in the said token are transmitted from the terminal T to the said token TOKEN. For example the format must be binary or ASCII. Using the securing information SINF, the said token is notified that a sensitive command has been sent. According to a special, non-limiting mode of realisation, the said securing SINF and formatting FINF information are input parameters of the command CD sent.

For example, a signature check command includes parameters such as:

the signature to be checked, the signed transaction data, the securing information, the formatting information.

In a second step, for any sensitive potential result of the command, input at least one item of digitisable information NB via the interface I including the input device K. According to a first non-limiting mode of realisation, the input device K is a keyboard. According to a second mode of realisation, the said device is a touch screen. It could also be a microphone.

Figure 2:
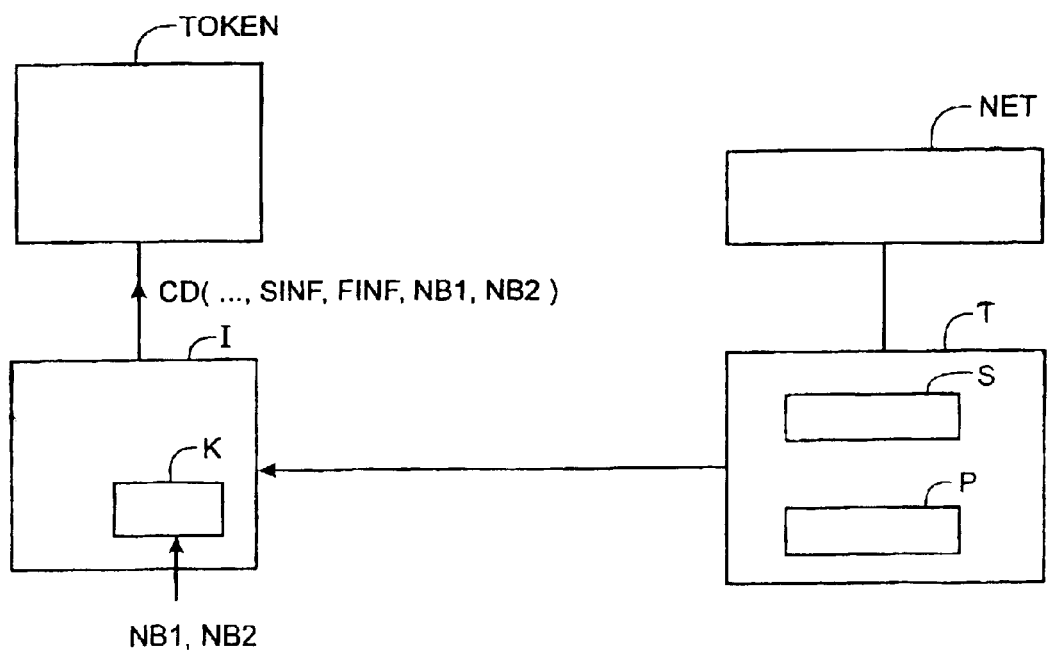
FIG. 2 is a diagram representing a first exchange of data between the terminal and the token of FIG. 1.

According to a special, non-limiting mode of realisation, the said item(s) of digitisable information NB are input parameters of the command CD sent to be executed. As shown on FIG. 2, the signature check command includes parameters such as:

the signature to be checked, the signed transaction data, the securing information SINF, the formatting information FINF, an item of digitisable information NB1 corresponding to a first sensitive potential result, a second item of digitisable information NB2 corresponding to a second sensitive potential result, etc.

A sensitive potential result means one which could compromise the security of the services offered by the application program P if the defrauder should manage to modify the said result.

Note that a result of a command may be sensitive in a particular context and not in another. The sensitive nature of the result is also estimated during the design of the application program P.

The execution of a command CD may potentially give a positive or negative result. In addition, there may be various types of positive or negative result. For example, for a command to update secret data in a token, a first negative result may be obtained indicating a write error, a second negative result indicating that the token is unavailable and that a later test can be carried out or a positive result indicating correct execution of the command. Generally the type of a result is supplied through an associated unique status value SW returned by the said token. We may consider, for example, that only the negative results are sensitive and then input one or more items of digitisable information NB only for these two potential negative results.

Figure 3:
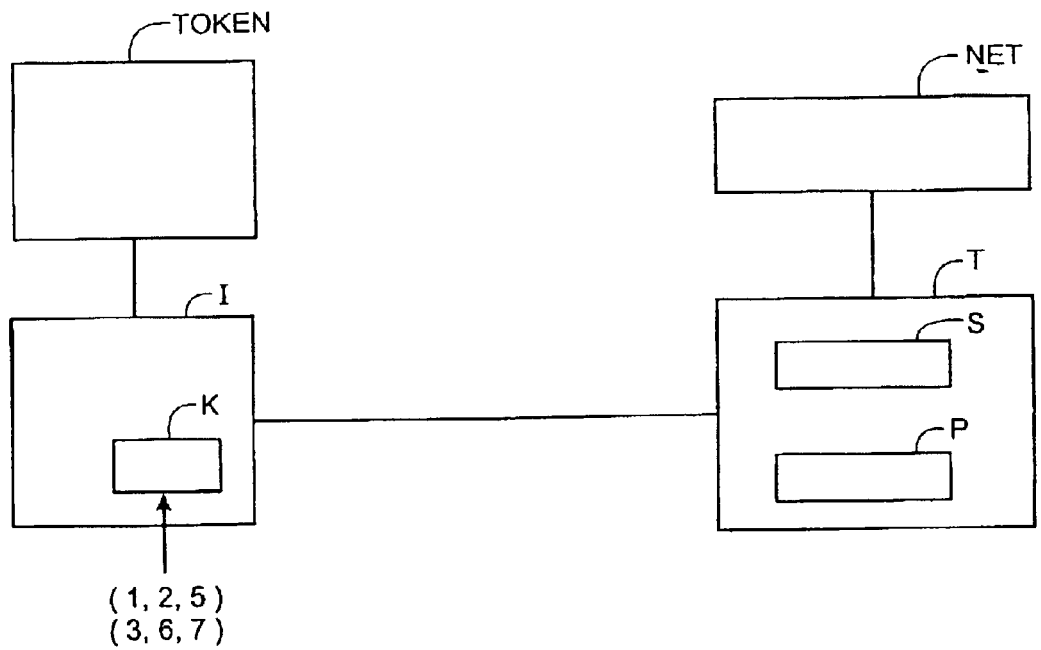
FIG. 3 is a diagram representing a second exchange between the terminal and the token of FIG. 1.

In the example shown on FIG. 3, for a signature check command, we assume that we have a choice between a single positive result and a single negative result and that both are sensitive. Either the signature is correct, or the signature is incorrect. Using an input device K, in this case a keyboard, digitisable information is input, in this example the figures one, two and five for a correct signature and the figures three, six and seven for an incorrect signature.

We avoid using the same digitisable information or logical series of digitisable information, to prevent a defrauder from analysing the said information and finding the next item of information. Advantageously, the said at least one item of digitisable information NB is random. Thus, the defrauder is unable to simulate, predict, or guess the said at least one item of digitisable information NB.

According to a first non-limiting mode of realisation, the said token TOKEN is an integrated circuit card and the interface I is a reader.

According to a second mode of realisation, the said token is an electronic security key such as, for example, the keys generally known as dongles with a serial interface, or the electronic keys including a USB type interface.

According to another mode of realisation, the said token is a PCMCIA type card.

Advantageously, the user of the said token is informed that the interface I is waiting for the input of the said at least one item of digitisable information NB. This information is for example provided by a message sent to the user by the communication device S of the terminal T requesting the user to input the item(s) of digitisable information corresponding to the sensitive results or by a voice message, accompanied by the flashing of a luminous indicator on the interface I.

In a third step, the said at least one item of digitisable information NB input is transmitted to the said token TOKEN and formatted according to the formatting information FINF transmitted beforehand. The formatting is carried out directly in the token or in the interface I. Of course, in the latter case, the formatting is carried out before sending the said information NB to the said token TOKEN.

In a fourth step, the said command CD is executed in the said token. The said execution supplies a result RES. The token TOKEN includes means to associate a result RES with the corresponding said at least one item of digitisable information NB (not shown). Thus, after detecting the presence of the securing information SINF, the said token triggers the said association means. According to another non-limiting mode of realisation, it is possible to check whether or not the said securing information SINF has been activated, the said information being in this case always present as a parameter of a command CD.

Figure 4:
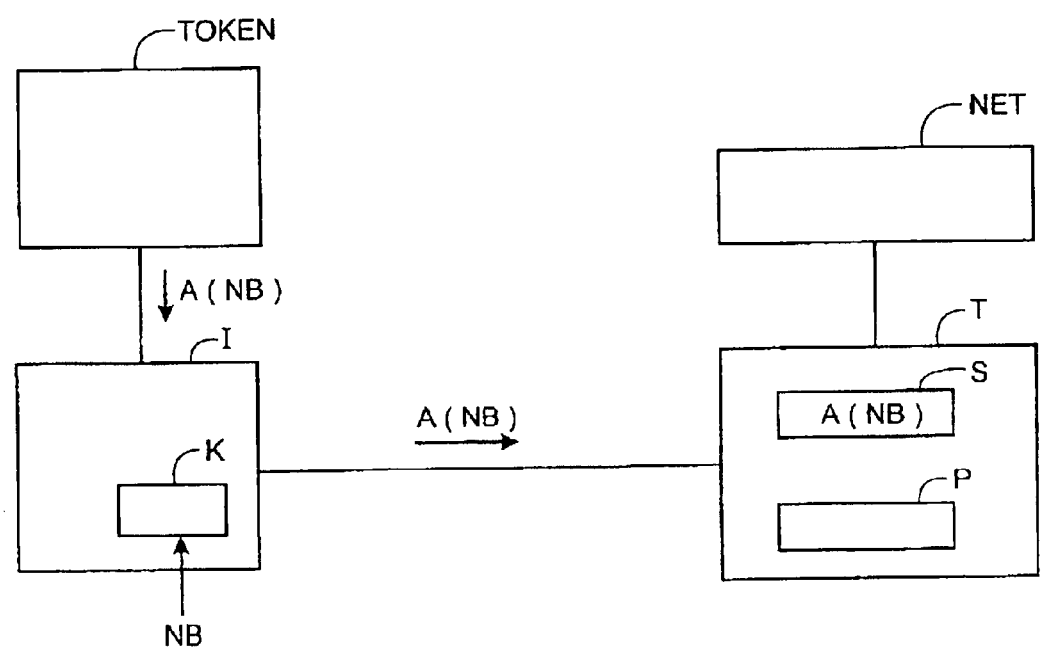
FIG. 4 is a diagram representing a third exchange between the terminal and the token of FIG. 1.

In a fifth step, as shown on FIG. 4, an answer A indicating the result RES of executing the command is transmitted from the said token TOKEN to the terminal T, the said answer A including, for a sensitive result, the said at least one item of digitisable information NB associated with the said result.

According to a first realisation variant, the answer A includes the said at least one item of digitisable information NB and the unique status value SW associated with the result. Preferably, according to a second realisation variant, the answer A transmitted from the said token to the terminal includes only the said at least one item of digitisable information NB.

Note that since the token is connected to the interface I, all the information exchanges described take place via the said interface I, in a secured way, as it would be difficult for a defrauder to spy on communications between the token and the said interface I.

Finally, in a last step, if the result is sensitive, a check is carried out using the communication device S of the said terminal T to ensure that the said answer does include the said at least one item of digitisable information input NB.

According to a non-limiting mode of realisation, the communication device S is a voice device. According to the example shown on FIG. 3 seen previously, the communication device S is a screen. During a signature check, if the result is positive, the figures one, two and five are transmitted to the terminal T and then displayed on the screen. If the result is negative, the figures three, six and seven are displayed. The supplier therefore checks on the screen of his terminal that everything occurred correctly. A defrauder who tries to modify the result of a command, does not know the figures input by the user of the token. In the signature check example, if the result of the check is negative and if the defrauder changes it into a positive result, the answer A displayed on the screen will not contain the figures input corresponding to the negative result, Thus, in spite of a message displaying that the command was correctly executed, the supplier will conclude that an error has nevertheless occurred and will reject the transaction request. The same applies for a negative result.

However, the terminal T may contain a virus which substitutes one command for another command. Afterwards, without realising, the user of the token checks the result of executing a command which was sent and executed illegally, instead of another. Thus, advantageously, before executing a sensitive command CD, indication information IINF is input via the interface I, the said information IINF indicating the sensitive command to be executed (not shown). It is transmitted to the said token TOKEN. Preferably, the indication information UNF is input when inputting the digitisable information. Then, in the token TOKEN, a check is carried out using the indication information IINF to ensure that the command CD sent by the terminal T corresponds to the command expected by the user. If the check is positive, everything occurred correctly and the steps described previously are carried out from the third step. Otherwise, the user is notified that an error has occurred. Note that inputting the indication information IINF is useful if several sensitive commands have been defined. If only one command CD is defined as sensitive, the check is carried out automatically in the token TOKEN on this single command, the user inputs no indication information.

What is claimed is:

1. A method of executing a command in a system that comprises a token connected to a terminal, the terminal including a communication device, wherein the method includes:

a preparation step in which an application program operatively connected to the terminal carries out a first check to ensure that the command has previously been classified as sensitive for the security of the system, the command being able to generate a result, wherein the result has been previously been classified from one selected from the group consisting of sensitive and not sensitive for the security of the system; and if the command has a sensitive nature for the security of the system, the method includes:

a protection step in which at least one item of data is input via an interface associated with the token and the terminal, the interface including an input device, wherein the at least one item of data is transmitted to the said token;

an execution step in which the token executes the command;

an answering step in which the token transmits to the terminal an answer indicating the result of executing the command, the answer including the at least one item of data and if the result of the command has previously been classified as sensitive, the at least one item of data is associated with the result; and an authentication step in which, if the result of the command has previously been classified as sensitive, the system carries out a second check using the communication device of the terminal to ensure that the answer includes the at least one item of data that is associated with the result.

2. The method according to claim 1, wherein the method includes an additional step according to which the user of the token is informed that the interface is waiting for the input of the at least one item of data.

3. The method according to claim 1, wherein the at least one item of data is random.

4. The method according to claim 1, wherein the method includes an additional step according to which, an item of securing data as well as an item of formatting data of the at least one item of data are transmitted from the terminal to the token.

5. The method according to claim 1, wherein the method includes an additional step according to which, before executing a sensitive command, an item of indication data is input via the interface, the item of indication data indicating the sensitive command to be executed.

6. The method according to claim 5, wherein the method includes an additional step according to which, a check using the item of indication data is carried out in the token to ensure that the command sent by the terminal corresponds to the command expected by the user.

7. The method according to claim 1, wherein the token is an integrated circuit card and the interface is a reader.

8. A system that comprises a token connected to a terminal, the terminal including a communication device, wherein the system includes:

preparation means for carrying out a first check to ensure that the command has previously been classified as sensitive for the security of the system, the command being able to generate a result, wherein the result has previously been classified as one selected from the group consisting of sensitive and not sensitive for the security of the system;

protection means for requesting an input of at least one item of data when any result of the command has previously been classified as sensitive, the input being requested via an interface associated with the token and the terminal, the interface including an input device for transmitting the at least one item to the token, execution means for executing the command within the token, answering means for transmitting from the token to the terminal an answer indicating the result of the execution of the command, the answer including the at least one item of data and, if the result of the command has previously been classified as sensitive, the at least one item of data is associated with the result, and authentication means for determining whether the result of the command has previously been classified as sensitive, and, if so, configured to carry out a second check using the communication device of the terminal to ensure that the answer includes the at least one item of data that is associated with the result.

9. A terminal for use in a system that comprises a token connected to the terminal, the terminal including a communication device, wherein the terminal includes:

preparation means for carrying out a first check to ensure that the command has previously been classified as sensitive for the security of the system, the command being able to generate a result, wherein the result has previously been classified as one selected from the group consisting of sensitive and not sensitive for the security of the system; the system comprising:

protection means for requesting an input of at least one item of data when the result of the command has previously been classified as sensitive, the input being requested via an interface associated with the token and the terminal, the interface including an input device for transmitting the at least one item to the token, execution means for executing the command within the token, answering means for transmitting from the token to the terminal an answer indicating the result of the execution of the command, the answer including the at least one item of data and, if the result of the command has previously been classified as sensitive, wherein the at least one item of data that is associated with the result, and authentication means for determining whether the result of the command has previously been classified as sensitive, and, if so, configured to carry out a second check using the communication device of the terminal to ensure that the answer includes the at least one item of data that is associated with the result.

10. A token for use in system that comprises a terminal to which the token is connected, the terminal including a communication device, wherein the system includes:

preparation means for carrying out a first check to ensure that the command has previously been classified as sensitive for the security of the system, the command being able to generate a result, wherein the result has previously been classified as one selected from the group consisting of sensitive and not sensitive for the security of the system;

protection means for requesting an input of at least one item of data when any result of the command has previously been classified as sensitive, the input being requested via an interface associated with the token and the terminal, the interface including an input device for transmitting the at least one item to the token;

execution means for executing the command within the token;

answering means for transmitting from the token to the terminal an answer indicating the result of the execution of the command, the answer including the at least one item of data and, if the result of the command has previously been classified as sensitive, the at least one item of data that is associated with the result; and authentication means for determining if the result of the command has previously been classified as sensitive, and, if so, configured to carry out a second check using the communication device of the terminal to ensure that the answer includes the at least one item of data that is associated with the result.

* * * * *